United States Patent [19]

Fister et al.

[11] Patent Number: 4,597,150

[45] Date of Patent: Jul. 1, 1986

[54] METHOD OF AND APPARATUS FOR CLOSING JOINT DEVICES TO OBTAIN CONSISTENT TORQUE VALUES

[75] Inventors: Louis P. Fister, St. Louis, Mo.; Lawrence H. Fitch, Cahokia, Ill.; Herby O. Pearson, Chesterfield, Mo.

[73] Assignee: Moog Automotive, Inc., St. Louis, Mo.

[21] Appl. No.: 705,119

[22] Filed: Feb. 25, 1985

[51] Int. Cl.[4] ...................... B23Q 17/00; B21D 53/10
[52] U.S. Cl. .................................. 29/407; 29/149.5 B
[58] Field of Search ......... 29/243.52, 441 R, 149.5 B, 29/434, 407

[56] References Cited

U.S. PATENT DOCUMENTS

| 3,221,391 | 12/1965 | Heim | 29/149.5 B |
|---|---|---|---|
| 3,395,441 | 8/1968 | Herbenar | 29/441 |
| 3,395,442 | 8/1968 | Herbenar | 29/441 |
| 3,430,327 | 3/1969 | Herbenar | 29/243.52 |
| 3,464,723 | 9/1969 | Herbenar | 287/87 |
| 3,656,221 | 4/1972 | Scheublein, Jr. et al. | 29/149.5 |
| 3,831,245 | 8/1974 | Amos | 29/149.5 B |
| 3,857,149 | 12/1974 | Hassan | 29/149.5 B |
| 3,999,872 | 12/1976 | Allison | 29/149.5 B |
| 4,163,310 | 8/1979 | Sigmund | 29/407 |
| 4,286,363 | 9/1981 | Morin | 29/149.5 B |
| 4,290,181 | 9/1981 | Jackson | 29/149.5 B |

Primary Examiner—Howard N. Goldberg
Assistant Examiner—Steven Nichols
Attorney, Agent, or Firm—Gravely, Lieder & Woodruff

[57] ABSTRACT

The assembling of a ball joint to obtain a consistent torque reaction value of a desired level is accomplished by applying a torque responsive probe to the shank of a headed stud such that the rotation of the headed stud will develop a signal proportional to the torque reaction of the headed stud on the bearings in the ball joint, closing the housing upon the headed stud while sensing the torque reaction to be able to stop the closing of the housing when the torque reaction of the headed stud in the housing has reached a desired value, and applying the assembling technique to a run of similar ball joints to produce consistency of results.

12 Claims, 4 Drawing Figures

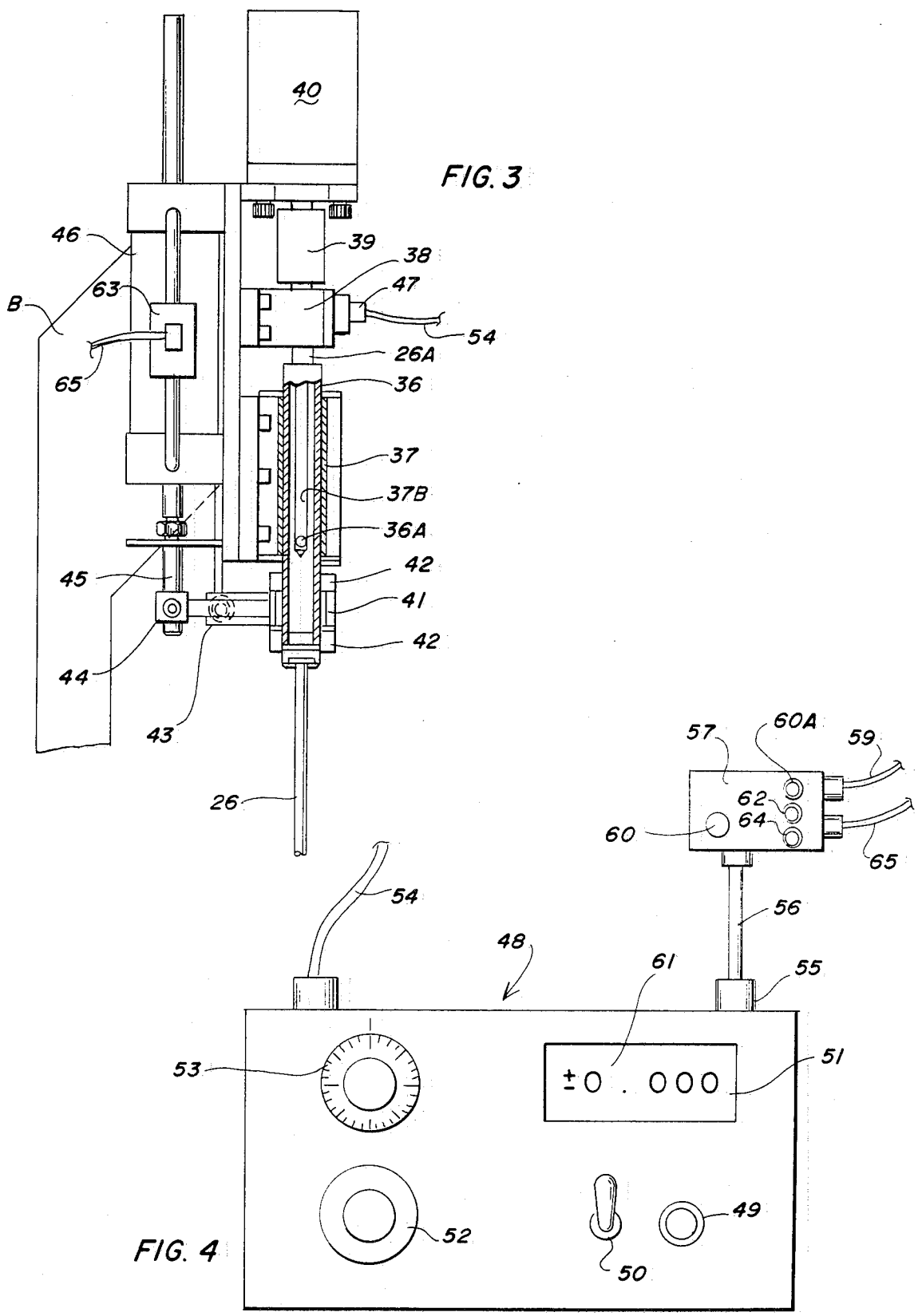

METHOD OF AND APPARATUS FOR CLOSING JOINT DEVICES TO OBTAIN CONSISTENT TORQUE VALUES

BACKGROUND OF THE INVENTION

1. Field of the Invention

This invention is directed to controlling the torque reactions in joint devices, particularly automotive ball joint devices, and to methods and apparatus for achieving that result.

2. Description of the Prior Art

The closest prior art is represented by U.S. Pat. Nos. of Herbenar 3,395,441 of Aug. 6, 1968 and its divisional 3,430,327 of Mar. 4, 1969, as well as Herbenar 3,395,442 of Aug. 6, 1968 and its divisional 3,464,723 of Sept. 2, 1969. This prior art teaches applying a static preload on the internal components of ball joint devices and thereafter rotating a flanging tool on the stationary housing to close the open end while holding the static preload. It is said that the static preload takes into account the tolerance buildup in the components. Also for a static preload the torque of the stud relative to the housing will vary due to contact between the components. The problem with this approach is that the spin closure of the housing introduces a force that can increase or decrease the static preload significantly due to the unreliable reaction of the spin rollers in the tool which are spring loaded so they can yield to radially deform the housing during the closing step. A more reliable way to manufacture ball joints with consistent torque loading has not been known prior to the method and apparatus set forth herein.

The prior art also includes Scheublein et al U.S. Pat. No. 3,656,221 of Apr. 18, 1972 wherein there is disclosed a method for assembling ball joint components so as to eliminate internal clearance between components due to manufacturing tolerances. More specifically the load transmitting ball stud component of the ball joint assembly is supported in a fixed position independent of the housing and the housing support during the closing of the housing flange.

In providing automotive vehicles with ball joint devices in the suspension systems in some cases, it is important to the uniformity of the steering reaction to obtain a uniform feel. It is recognized that steering systems that are either too tight or too loose are highly undesirable as it has a direct effect on the handling characteristics of the vehicle.

In the past the production of ball joint devices has been affected by the range of tolerances in the several parts that make up the ball joint. Apparatus for assembling ball joints has been generally independent of the tolerance factors with the result that a mismatch of tolerances may produce high or low torque values between the ball stud and the housing.

BRIEF SUMMARY OF THE INVENTION

The present invention has as a primary object the closing together of the components of a joint device by a method that the torque value between the ball stud and housing can be consistently repeated in a series of similar joint devices.

A preferred method comprises an apparatus with a system of controls which are conditioned to select and store a predetermined torque value and compare that value to a value which is obtained during closing of joint devices and stops the closing operation when the torque value becomes the same as the stored torque value so all joint devices have substantially the same torque values.

According to the invention, a socket of a selected joint device with a first bearing means therein is held in position while a stud head is rotated between said first bearing means and a second bearing means and pressed by said second bearing means during closing operation to develop a torque value, transducer means receive signals representative of the torque value of the stud relative to the two bearing means, a signal processor receives the transducer signals, and it is preset to a value which represents the desired torque value for the selected joint device and the signal processor stops the closing operation when the value of the transducer signal becomes the same as the preset value in the signal processor, thereby all joint devices have substantially the same torque values.

BRIEF DESCRIPTION OF THE DRAWINGS

Preferred embodiment of the present invention is disclosed in the accompanying drawings herein:

FIG. 3 is a detail of the apparatus showing the rotary and axial drive of the torque probe which monitors the torque in the joint device during its production; and FIG. 4 is a schematic view of the control system for governing the operation of the apparatus.

DETAILED DESCRIPTION OF THE EMBODIMENTS

Figure 1:
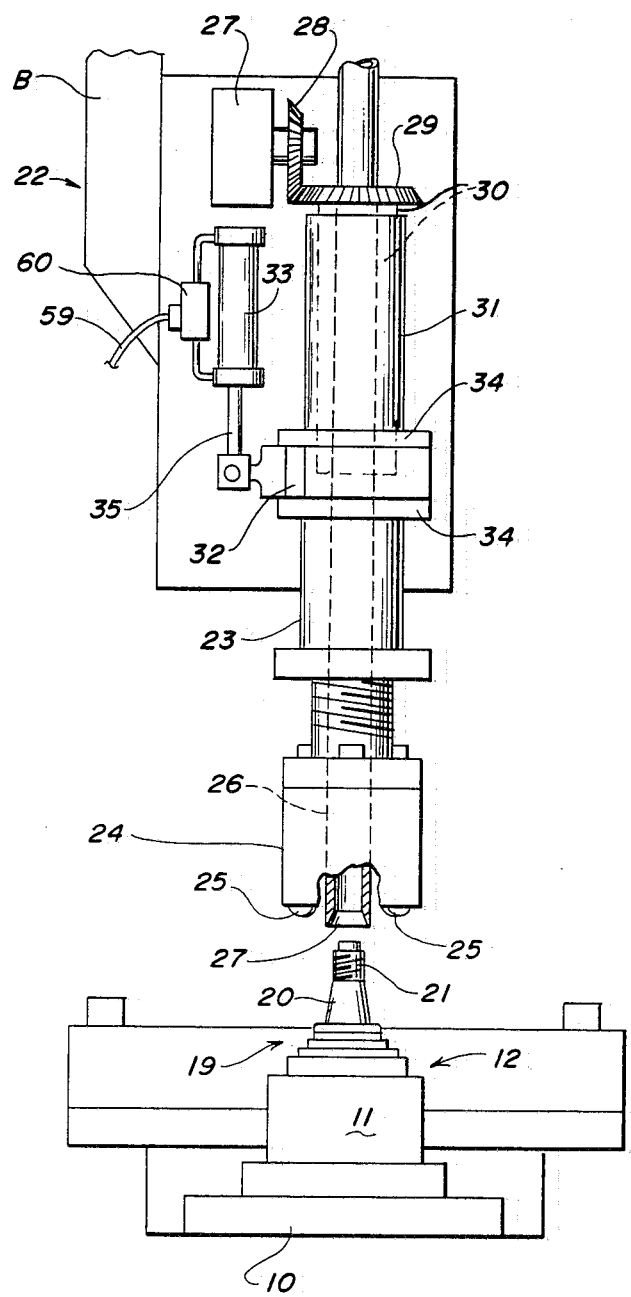
FIG. 1 is a schematic view of the apparatus for practicing the method of controlling torque in joint devices.
Figure 2:
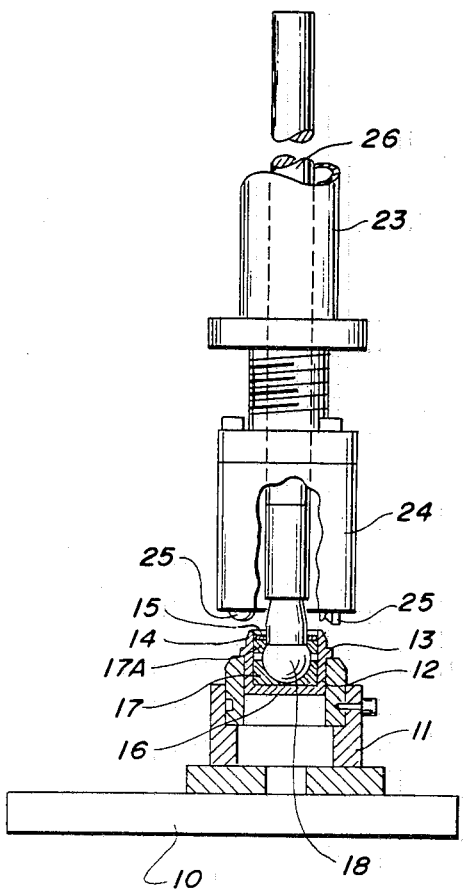
FIG. 2 is a further schematic view of the apparatus in an advanced position of operation.

In FIGS. 1 and 2 there is seen in schematic views the essential elements of apparatus for turning out ball joint devices which have a substantially similar torque value. The apparatus consists of a support base 10 for a fixture 11 to receive a ball joint housing or socket 12 and support the housing by its external annular flange 13 with its open end uppermost so the flange 14 can be closed relative to the usual closure plate 15. The housing 12 is closed at its end 16 to retain a suitable first bearing 17, the headed end 18 of a load bearing stud 19, and a second bearing 17A. The outer end of the stud is formed with a tapered shank 20 and a threaded terminal end 21.

Spaced above the fixture 11 with sufficient clearance to allow for the placement and removal of ball joints from the fixture 11 there is a tool assembly 22 for the operative components which are required to produce ball joints having substantially uniform torque characteristics of a desired value. The tool assembly 22 carries a tubular shaft 23 movable in a vertical direction to raise and lower and also rotate a spinning head 24. The head 24 supports a plurality of spinning rolls 25 (two being shown) that surround a torque probe 26. The probe 26 has an internally tapered end 27 that is presented for engaging the tapered shank 20 of a load bearing stud 19 by being advanced over the threaded end 21 of the stud 19 (see FIG. 2).

The spinning head 24 is both axially movable and rotatable in order to perform the function of closing the socket flange 14 over the closure plate 15 and upper bearing 17A to exert a load on the headed end 18 of the stud 19. The assembly 22 houses a variable speed motor 27 driving a bevel gear 28 engaged with a second bevel gear 29 for rotating an externally splined shaft 30 mounted internally of the splined upper end 31 of the tubular shaft 23. The shaft 23 is axially movable along the splined shaft 30 by means of a collar 32 which allows the shaft 23 to rotate while the collar 32 is actuated by an air cylinder 33 to raise and lower the shaft 23. The collar 32 is positioned between upper and lower bearing rings 34 fastened to the shaft 23 so the collar 32 is captured between the rings 34. The collar 32 is raised and lowered by being connected to the rod 35 of the air cylinder 33. Any other suitable drive means for rotating and axially moving the shaft 23 may be employed. What is depicted in FIG. 1 is sufficiently simple to allow the tool assembly 22 to be compact. One of the requirements for the assembly 22 is to allow the probe 26 to extend axially through that assembly and be operatively connected to a separate drive assembly seen in FIG. 3 to which attention is now directed.

In FIG. 3, the probe 26 has its upper end attached to a torque sleeve 36. The sleeve 36 is slidably mounted in a guide bracket 37 carried by the assembly 22. The torque sleeve 36 is slidably mounted on torque shaft 26A. Pin 36A is secured to torque shaft 26A and it is in engagement with slot 37B of torque sleeve 36. This arrangement allows axial movement of torque sleeve 36 relative to torque shaft 26A, but prevents relative rotation between the two. The torque shaft is attached at one end to a torque transducer 38 which is fixed by a suitable bracket to assembly 22. The other end of torque transducer 38 is attached to the shaft of drive motor 40 via coupling 39. The axial movement of the probe 26 is obtained through a collar 41 that is free on the sleeve 36 but captured between upper and lower bearing collars 42 fixed on the sleeve 36. The collar 41 is attached to an arm 43 which has its outer end connected at 44 to the rod 45 of an air cylinder 46. Thus, the probe 26 is able to move axially upon actuation of the cylinder 46 and is, at the same time, able to be rotated by its drive motor 40. The transducer 38 is sensitive to the rotation of the probe and has a signal output terminal 47 which will be referred to presently. The support of the assembly seen in FIG. 3 is provided by a bracket B that extends upwardly from the tool assembly 22 (FIG. 1).

FIG. 4 is a schematic view of the control system for the apparatus. A signal processor 48 is equipped with power on-off light 49, an on-off switch 50, a digital readout 51, a zero balance control 52, and a trip level control 53. The control system is connected by cable 54 to the transducer terminal 47 (FIG. 3). The incoming signals from the transducer 38 are processed by an amplifier, a comparator and suitable circuits (not shown). The output from the processor 48 is at terminal 55 where a cable 56 is connected to a second control 57 operatively associated with the cylinder 33 in the tool assembly 22, and cylinder 46 to activate the vertical movement of the shaft 23 and probe 26, and particularly the predetermined magnitude of the processed signal that will command the upward movement of the shaft 23 at the desired time.

Prior to operating the apparatus, certain adjustments are necessary to adapt the apparatus to each one of a particular series of production ball joints having similar physical characteristics as to size and desired torque. The speed of the probe motor 40 must be selected to produce the required stud torque value relative to the housing so as to meet the specification for a given vehicle. Normally, ball joints have relatively low turning velocities so the torque value must be determined for that condition. Therefore motor 40 must have speed adjustment capability so it can be set to rotate the probe 26 in a low speed range of from 10 to 50 RPM for example.

The apparatus must also be adjusted to meet the stud torque value in terms of inch-pounds for vertical force on the probe 26. Thus, the magnitude of the force exerted by the cylinder 46 on the collar 41 needs to be variable. For example, if the stud torque value relative to its housing bearings is specified to be 40 inch-pounds, then the vertical force of the cylinder 46 should develop at least 60 inch-pounds of torque before slippage will occur between the probe 26 and the stud 19. This assures drive contact. In this example, the probe 26 has a taper fit surface 27 mated with the taper of the stud shank 20. A taper fit between the probe 26 and the stud 19 is preferred since the unwanted vertical force produced by cylinder 46 can be removed as soon as locking engagement takes place between the probe 26 and stud shank 20. However, other connections can be employed, such as polygonal or screwdriver types with suitable evaluations for the torque values.

The second control 57 is connected by a cable 59 (see in FIGS. 4 and 1) to a double acting control valve 60 at the cylinder 33. While the source of air pressure is not necessary to show, the valve 60 is responsive to being actuated for pushing down on the collar 32 to advance the spinning head 24 for closing the open end flange 14 of the socket 12. That response is initiated by the push button 60A in control 57. Although the actuation can be automatic using timer, etc. retraction of the head 24 is automatic by response of the processor 48 receiving a torque value signal from the transducer 38 through cable 54, which signal is passed to control 57 through cable 56 and to the control valve 60 for reversing the cylinder 33 to raise the head 24.

Motor 27 is adjusted so its speed of rotation of the head 24 suits the spinning requirement of socket 12. Moreover, the assembly must be adjusted to suit the torque value requirement of the joint devices to be assembled. While motor 40 is rotating the adjustment is done by manually actuating the button 62 in control 57, which actuates a double acting control valve 63 connected to cylinder 46 to advance the probe 26 into predetermined locking engagement with the stud shank 20. After the locking engagement is completed, the vertical force will be removed from probe 26 by exhausting the air from cylinder 46. The torque between stud head 18 and bearing 17 as well as other inherent torque of the mechanism will be sensed by the torque transducer 38. That total torque reaction will be displayed in the window 61 of the processor 48 in the form of voltage. This voltage reading then is balanced out by introducing an equal magnitude but opposite polarity voltage by adjusting the zero balance control 52 until the digital reading is zero. Now there is zero torque as far as the comparator in the processor 48 is concerned. Having done the above the desired predetermined stud torque value is set in the processor 48 by the trip level control 53 which conditions the apparatus to assemble production joint devices with that predetermined torque value within plus or minus tolerances. By pushing button 64 the valve 63 will be energized in the opposite direction which causes the probe 26 to return to its original position. Since the probe 26 is frictionally locked to the stud shank, its retracting stroke is longer than that for the spinning head, thus allowing the head 24 to knock off the ball joint.

OPERATION

Start up of motor 40 and motor 27 will start the rotation of the probe 26 and the shaft 23 for the spinning head 24. Upon actuation of the cylinder 46, the probe 26 will advance to engage the stud shank 20 and be frictionally locked together for conjoint rotation. The vertical force from the probe 26 will now be removed by exhausting the air from cylinder 46, so the actual torque value can be displayed as the socket 12 is being closed. Next the cylinder 33 is actuated to drive the shaft 23 for the spinning head 24 down onto the flange 14 so the rollers 25 can close the flange 14 over the closure plate 15. As the head 24 moves down, the flange 14 will be turned in against the closure plate 15 which will move downward under the pressure. This causes the upper bearing 17A to be forced against the stud head 18 and consequently the stud head 18 against the lower bearing 17. This results in torque between the bearing 17A and 17, and stud head 18 which will be sensed by the transducer 38 via probe 26 and transmitted by cable 54 into the processor 48. As the torque increases by the closing operation and the transducer signal voltage, as converted in the manner noted above, reaches the preset torque value, the processor 48 will function through control 57 to command the head 24 and the probe 26 to retract so the ball joint can be removed from the fixture and another one put in place in the fixture for the next cycle. It is important to understand in the above method that the closing of ball joint sockets in the manner described will assure substantial consistent torque values as the stud torque generated during each closing cycle is used as a feed back to control the closing cycle. In the example where the torque value of 40 inch-pounds is used, it has been observed in a repetitive production run the torque value has varied between 39 and 41 inch-pounds which serves to illustrate the unique method of applying the torque value as adjusted at the start of a production run in a feed back control sense to maintain substantial uniform results. Also the operation can be fully automated instead of manual, except for pre-operational adjustments.

RESUME

It now appears from the foregoing details of the preferred embodiment that the method of the operating apparatus for closing together the components of joint devices having a socket, a first bearing means mounted in the socket, a stud projecting from the socket and having a head disposed between said first bearing and a second bearing in a predetermined torque value relation with said bearings will be achieved using certain important steps which include selecting proper RPM for the closing head and torque probe; cancelling initial torque between stud head and first bearing as well as other inherent torque of the mechanism; presetting the signal processor to the desired torque value; and while the stud is rotated and pressed downwardly by the second bearing during closing operation, increasing torque value will be developed. The closing operation will cease when the developed torque value becomes the same as the preset desired torque value. This method will assure that all subsequent devices will have substantially the same torque values.

It should also appear from the foregoing specification that the apparatus described therein combines a fixture 11 positioned to receive a socket of a ball joint device with the stud shank projecting therefrom, a drive shaft formed with an end presented to engage the projecting stud shank, drive shaft operating means arranged to engage the shaft end on the projecting stud shank for rotating the stud head relative to the bearing means in the socket, closing means positioned to engage the socket, operating means for rotating and moving the closing means toward and away from the socket, and a control system for regulating the drive shaft operating means and the operating means for the closing means, such that the control system sequentially operates the drive shaft operating means to receive torque value information, and operates both the drive shaft operating means and the operating means for said closing means for assembling the components of a joint device with a torque value substantially consistently equal to the desired predetermined torque value.

The foregoing method and described operation of apparatus is new and unique in that it assures the closure of joint devices with specified stud torque values that are consistent and substantially repetitive, and wherein the stud torque developed during closing operation is used as a feed back to control the apparatus and its method of operation.

It is, of course, recognized that changes and variations may come to mind after appreciating the foregoing disclosure, and understanding the preferred embodiment thereof and such variations are intended to be included within the scope of the invention.

What is claimed is:

1. A method of assembling a ball joint in which the housing is closed over a headed stud and bearings in the housing and the torque reaction between the headed stud and bearings meets a predetermined torque value, the method comprising the steps of:
    (a) placing the headed stud and bearings in an open housing;
    (b) joining a rotary probe to the headed stud and initially sensing the torque reaction between the rotating headed stud and bearings during the joining of the rotary probe;
    (c) cancelling out the torque initially sensed during the joining of the rotary probe to the headed stud and prior to closing of the housing;
    (d) closing the housing over the headed stud and bearings and monitoring the torque reaction of the headed stud as it is rotated in the bearings by the probe; and
    (e) terminating the closing of the housing upon the monitored torque reaction reaching the predetermined torque value.

2. The method of claim 1 wherein the steps of sensing the torque reaction during joining of the rotary probe to the headed stud and during the closing of the housing is translated into electrical signals.

3. The method of claim 1 wherein pressure is initially applied on the rotary probe during joining thereof to the headed stud, and thereafter the applied pressure is removed to effect the cancelling out of the torque sensed during the initial step of joining of the probe to the headed stud.

4. A method of assembling a ball joint in which the housing is closed as a headed stud is rotated in the housing and the torque reaction values are monitored, the method comprising the steps of:
    (a) joining a rotary probe to a headed stud disposed in an open ball joint housing, the joining occurring under an applied load on one of the probe or the housing;

(b) initially generating a signal which represents the torque value during the applied load joining of the rotary probe and extraneous torque values;

(c) removing the applied pressure from the probe and cancelling the remaining value of the generated signal by a signal of equal and opposite polarity;

(d) introducing a signal value equal to a desired predetermined torque reaction of the headed stud in the ball joint housing;

(e) closing the ball joint housing about the headed stud as it is rotated by the rotary probe and again generating a signal which represents the torque value of the headed stud relative to the ball joint housing free of applied load; and (f) terminating the closing of the ball joint housing upon the signal again generated during the closing of the ball joint housing substantially equalling the introduced predetermined signal value.

5. In apparatus for controlling torque reactions in the assembly of ball joints having a housing with a flanged open end to receive bearing means and the headed end of a ball joint stud with a stud shank projecting from the housing open end, the improvement in such apparatus which comprises:

(a) a support for the housing of a ball joint;

(b) a ball joint stud probe having means to join up with the stud shank and effect a rotary driving connection;

(c) rotary drive means connected to said probe, including signal generating means to generate a first signal representative of the torque exerted upon the headed end of the ball joint stud by said rotary drive means;

(d) control means connected to said signal generating means to generate signals representative of the torque exerted upon the headed end of the ball joint stud, said control means including a zero balance control for cancelling said first generated signal, and a second control for selecting a desired predetermined torque reaction level in the apparatus;

(e) rotary housing closing means movable into engagement with the flanged open end of the housing for closing the flange upon the headed end of the ball joint stud, said rotary housing means and said rotary drive means being operated together whereby said means to generate a signal representative of the torque exerted upon the headed end of the ball joint stud generates a second signal during the closing of the housing; and (f) means in said control means for terminating the closing of the housing upon the second signal attaining a value substantially equal to the predetermined torque reaction level selected by said second control.

6. The improvement in the apparatus set forth in claim 5 wherein said probe and said closing means are telescopically related, separate means is operatively connected to said probe and said closing means for moving each thereof toward and away from a ball joint, and said signal generating means is located in said separate means operatively connected to said probe.

7. The improvement in the apparatus set forth in claim 5 wherein said rotary housing closing means is a spinning head, said probe extends axially through said spinning head, and separate drive means is connected to said probe and to said spinning head for advancing and withdrawing said probe and spinning head relative to a ball joint in said ball joint housing support.

8. The improvement in the apparatus set forth in claim 5 wherein said probe is joined up with the stud shank by a press fit, and said first signal generated by said signal generating means represents the amount of pressure exerted upon the headed end of said stud in effecting the press fit joining between said probe and stud shank.

9. A ball joint assembling apparatus in which the ball joint consists of a housing with an open end, bearings in the housing and a stud with a head end supported by the bearings and a shank projecting from the open end of the housing, said apparatus comprising:

(a) probe means for connection with the stud shank;

(b) operating means connected to said probe means for rotating said probe means and moving said probe means into and out of driving engagement with the stud shank;

(c) housing closing means;

(d) drive means connected to said housing closing means for rotating said closing means and moving it toward and away from the open end of the housing;

(e) torque sensitive signal generating means operably connected to said probe operating means for generating signals representative of the torque reaction of said probe means to the torque reaction of the headed end of the stud relative to the bearings;

(f) control means operably connected to said torque sensitive generating means and to said drive means connected to said housing closing means, said control means including first means for responding to the signal generating by said signal generating means upon probe driving engagement with the stud shank, second means for cancelling the signal from said first means by a signal of equal and opposite polarity, and third means to introduce a predetermined torque value desired upon closing of the housing; and (g) means in the control means for initiating the operation of said housing closing means and for terminating the closing of the housing upon said torque sensitive signal generating means generating a signal substantially equal to the predetermined torque value introduced by said third means of said control means.

10. The ball joint assembling apparatus set forth in claim 9 wherein said probe means telescopes through said housing closing means.

11. The ball joint assembling apparatus set forth in claim 10 wherein said operating means moves said probe means into frictional engagement with the stud shank and moves said probe means and the ball joint such that the ball joint is knocked off said probe means on engaging said housing closing means upon moving said probe means out of driving engagement with the stud shank.

12. The ball joint assembling apparatus set forth in claim 9 wherein said torque sensitive signal generating means is a transducer rotatable with said probe operating means.

* * * * *